(12) United States Patent
Shiah et al.

(10) Patent No.: US 10,923,978 B2
(45) Date of Patent: Feb. 16, 2021

(54) HAIRPIN WINDING ELECTRIC MACHINE

(71) Applicant: Ford Global Technologies, LLC, Dearborn, MI (US)

(72) Inventors: Kyi Shin Shiah, Northville, MI (US); Huifen Qiu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 16/110,526

(22) Filed: Aug. 23, 2018

(65) Prior Publication Data

US 2020/0067362 A1 Feb. 27, 2020

(51) Int. Cl.
*H02K 3/28* (2006.01)
*H02K 1/16* (2006.01)
*H02K 3/12* (2006.01)
*H02K 3/50* (2006.01)

(52) U.S. Cl.
CPC .............. *H02K 3/28* (2013.01); *H02K 1/165* (2013.01); *H02K 3/12* (2013.01); *H02K 3/50* (2013.01)

(58) Field of Classification Search
CPC .............................................. H02K 1/12–165
USPC ................................................ 310/179–215
See application file for complete search history.

(56) References Cited

U.S. PATENT DOCUMENTS

| | | | |
|---|---|---|---|
| 6,469,413 B1* | 10/2002 | Oohashi | H02K 3/50 310/184 |
| 6,661,146 B2* | 12/2003 | Oohashi | H02K 3/28 310/179 |
| 7,994,677 B2 | 8/2011 | Kouda et al. | |
| 8,604,655 B1* | 12/2013 | Ferran | H02K 5/225 310/71 |
| 9,876,406 B2 | 1/2018 | Han et al. | |
| 2003/0214190 A1* | 11/2003 | Congdon | H02K 15/0081 310/71 |
| 2014/0210286 A1* | 7/2014 | Guercioni | H02K 3/28 310/71 |
| 2018/0309337 A1* | 10/2018 | Lee | H02K 3/28 |

* cited by examiner

*Primary Examiner* — Quyen P Leung
*Assistant Examiner* — Minki Chang
(74) *Attorney, Agent, or Firm* — David B Kelley; Brooks Kushman P.C.

(57) ABSTRACT

An electric machine includes a stator core defining slots and hairpins disposed in the slots and selectively joined at connections to form windings. A U-shaped jumper has spaced legs interconnected by a U-portion. The legs are attached to a pair of the hairpins at a location radially outboard of the slots such that the U-portion faces the core. A terminal lead of the windings radially extends between the legs.

17 Claims, 9 Drawing Sheets

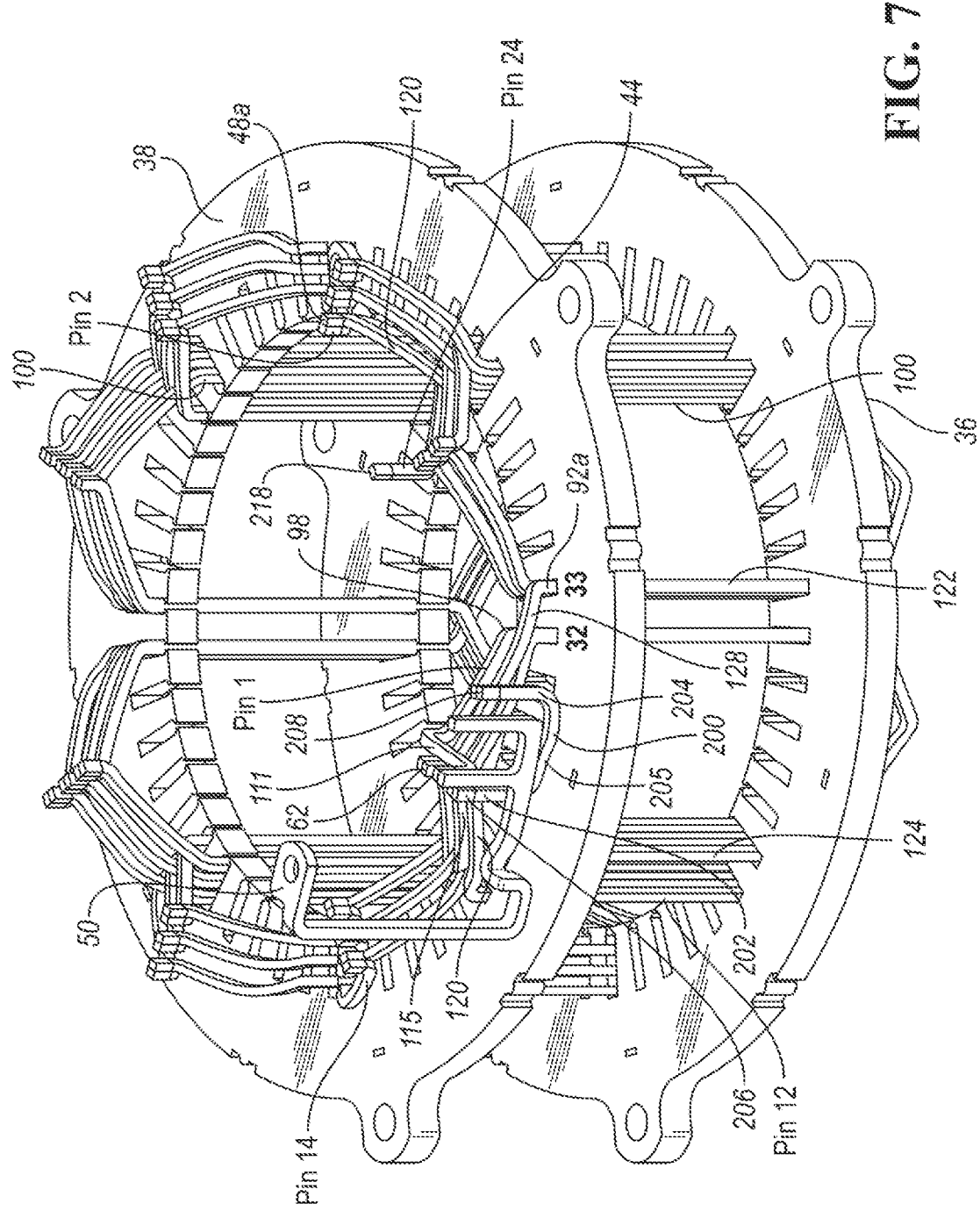

HAIRPIN WINDING ELECTRIC MACHINE

TECHNICAL FIELD

The present disclosure relates to electric machines and more specifically to electric machines that include hairpin windings.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

According to one embodiment, an electric machine includes a stator core defining slots and hairpins disposed in the slots and selectively joined at connections to form windings. A U-shaped jumper has spaced legs interconnected by a U-portion. The legs are attached to a pair of the hairpins at a location radially outboard of the slots such that the U-portion faces the core. A terminal lead of the windings radially extends between the legs.

According to another embodiment, an electric machine includes a stator core and windings disposed in the core. The windings are arranged in three phases each having at least a first path including only first hairpins interconnected to form a continuous circuit between a terminal end and a neutral end, and a second path having interconnected second hairpins and a jumper interconnecting adjacent ones of the second hairpins to form a continuous circuit between a terminal end and a neutral end.

According to yet another embodiment, an electric machine includes a stator core defining slots having radial positions, and a plurality of hairpins each having a first leg disposed in one of the radial positions of a one of the slots and a second leg disposed in one of the radial positions, that is a different radial position than the first leg, of a another of the slots. Select ones of the hairpins are interconnected to form at least three pairs of first and second parallel winding paths with each pair corresponding to one of three phases of the electric machine. Each of the slots only includes hairpins of a same one of the phases and the first and second paths alternate along the radial positions. At least three jumpers, each being associated with one of the phases and including a first leg attached to one of the hairpins of the first winding path and a second leg attached to another of the hairpins of the first winding path. The jumpers are located radially outboard of the slots, and a distance between the first and second legs of the jumpers is half of the distance between the first and second legs of the hairpins.

BRIEF DESCRIPTION OF THE DRAWINGS

FIG. 7 is a partial perspective view of the stator showing a first parallel path of a U phase of the windings and omitting the second parallel path and middle laminations for illustrative purposes.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
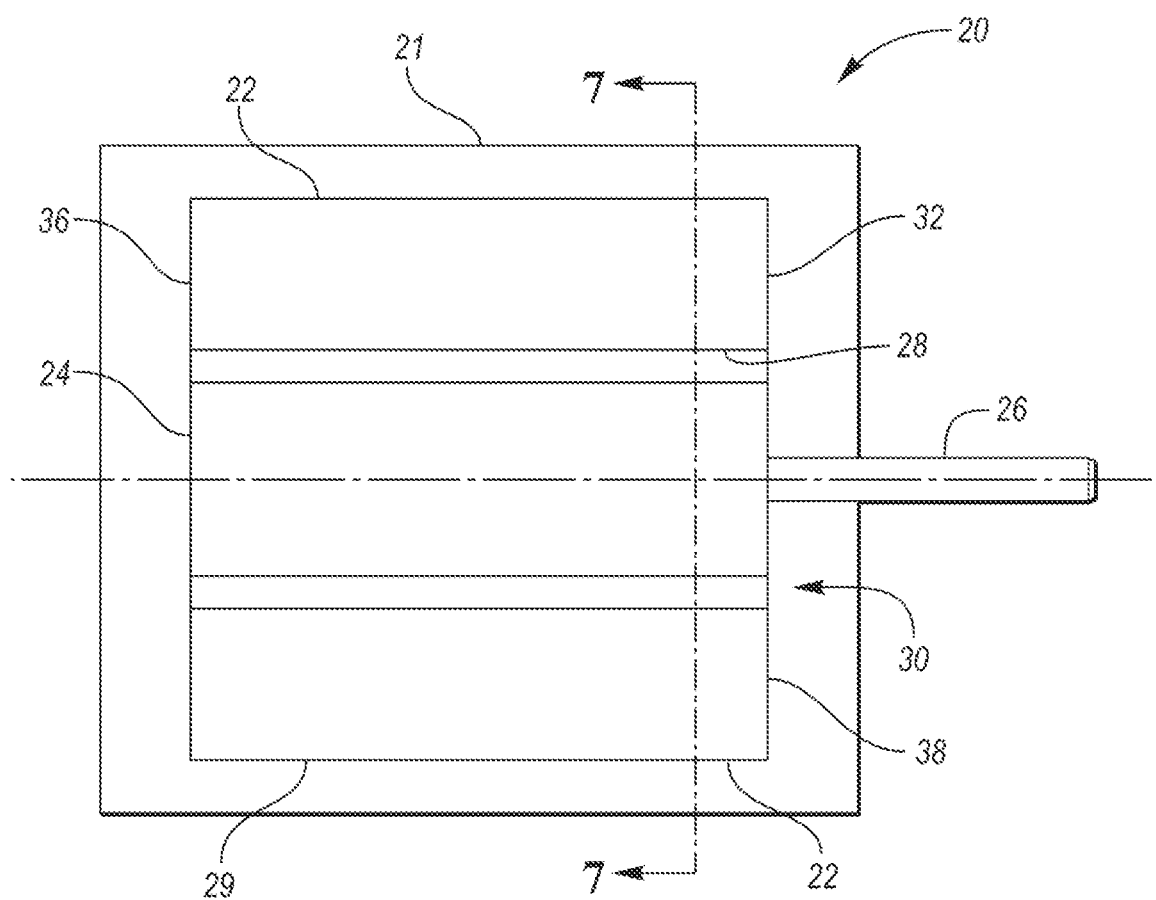
FIG. 1 is a schematic diagram of an electric machine.

Referring to FIG. 1, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a typical traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Figure 2:
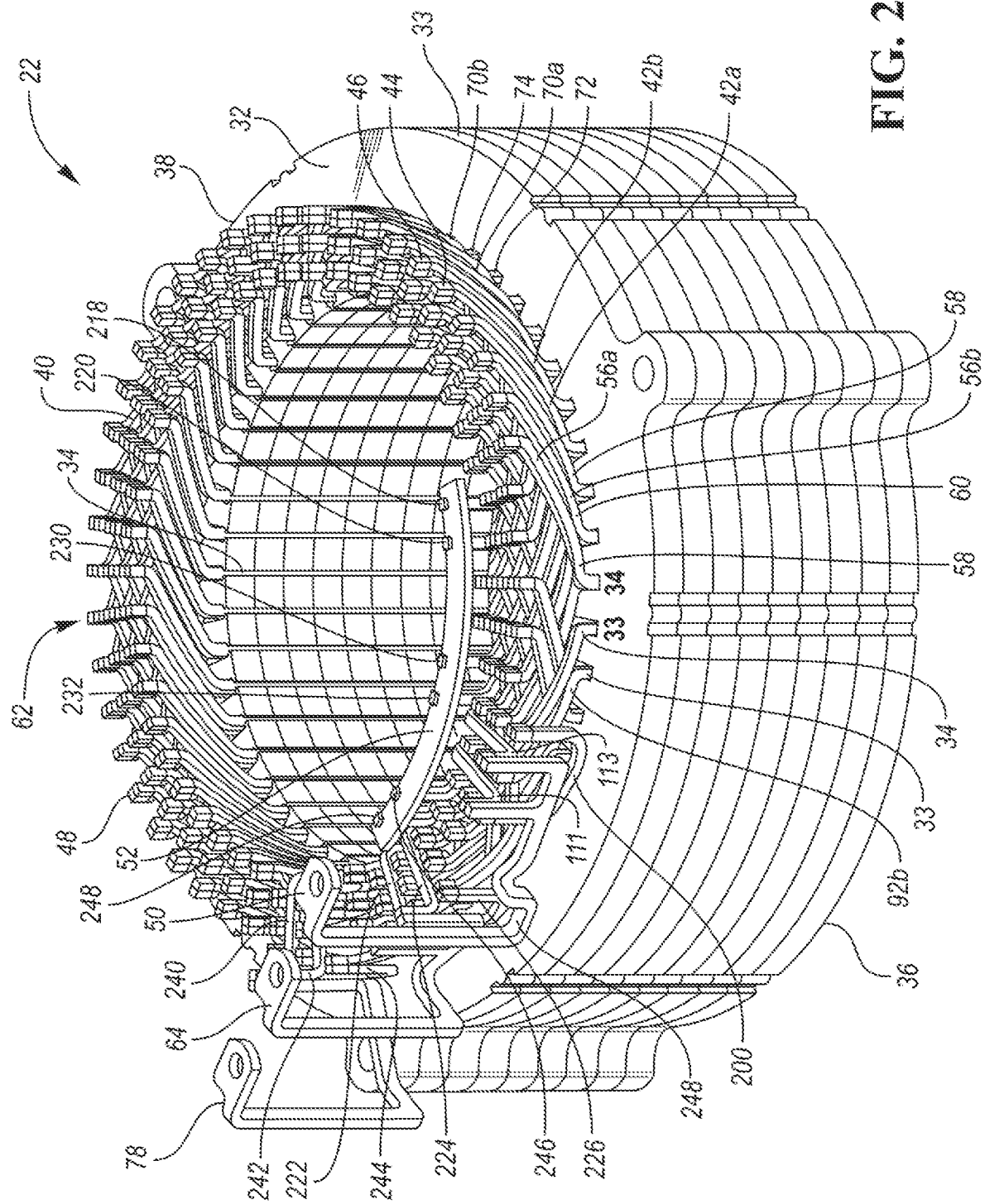
FIG. 2 is a perspective view of a stator of the electric machine.

Referring to FIGS. 1 and 2, the electric machine 20 includes a housing 21 that encloses the stator 22 and the rotor 24. The stator 22 is fixed to the housing 21 and includes a cylindrical core 32 having an inner diameter 28 that defines a hole 30 and an outer diameter 29. The core 32 may be formed from a plurality of stacked laminations 33. The rotor 24 is supported for rotation within the hole 30. The rotor 24 may include windings or permanent magnets that interact with windings of the stator 22 to generate rotation of the rotor 24 when the electric machine 20 is energized. The rotor 24 may be supported on a driveshaft 26 that extends through the housing 21. The driveshaft 26 is configured to couple with a drivetrain of the vehicle.

The stator core 32 defines slots 34 circumferentially arranged around the core 32 and extending outward from the inner diameter 28. The slots 34 may be equally spaced around the circumference and extend axially from a first end 36 of the core 32 to a second end 38. In the illustrated embodiment, the core 32 defines forty-eight slots and has eight poles, but the core 32 may include more or fewer slots and/or poles in other embodiments. For example, the core 32 may define seventy-two slots and have eight poles.

The slots 34 are spaced by a circumferential distance measured between the center lines of two adjacent slots. This distance can be used as a unit of distance (hereinafter "a slot") for relating and measuring other components of the stator 22. The distance unit "slot" is sometimes referred to as "slot pitch" or "slot span."

The electric machine 20 may include hairpin windings 40 placed in the slots 34 of the core 32. Hairpin windings are an emerging technology that improves efficiency for electric machines used in vehicles. The hairpin windings 40 improve efficiency by providing a greater amount of stator conductors to reduce resistance of the winding 40 without encroaching into space reserved for the electrical steel and the magnetic flux path. The hairpin windings 40 may be wave windings in which the windings 40 weave pole to pole in a wave-like pattern.

One challenge with hairpin winding is matching the electric machine design to the desired torque-speed curve. An essential step in designing an electric machine is selecting the phase turn number so that the torque-speed curve covers all required operating points. For conventional stranded windings made of long wires connected in parallel, the desired phase turn number is selected by choosing the number of turns per coil, the number of parallel paths, the number of poles, the number of slots per pole, and the number of layers. While all these factors are also available for hairpin windings, the limiting factors are very different resulting in fewer feasible choices.

For example, while the possible number of poles, slots per pole, and layers are identical between the two technologies, it is not practical in a hairpin winding to have as many turns per coil as in a stranded winding. Each hairpin needs to be connected to the next hairpin by welding, soldering or the like, and needs to be bent according to a specific shape in order to make the connection possible. This limits the number and size of the conductors that can be fit in a single slot. Another challenge is creating parallel circuits that are balanced (i.e., not causing large circulating currents in the loop formed by the parallel circuits due do dissymmetry) and have reasonably complex connections.

The electric machine 20 solves these and other problems. The electric machine 20 may be a three-phase machine in which the hairpin windings 40 are arranged in a U phase, a V phase, and a W phase. Each phase includes associated hairpins conductors (also known as pins, hairpins, or bar conductors) arranged in two parallel paths of windings in the illustrated embodiment. Each phase may include more or less parallel paths in other embodiments.

The hairpins are generally U-shaped and include a pair of legs joined at a vertex (also known as a crown). The hairpins are installed in the stator core 32 by inserting the legs through corresponding ones of the slots 34. All of the hairpins may be installed from the same end of the stator core 32, e.g., end 36, so that all of the vertexes are located on one end of the stator, e.g., end 36, and the ends of the legs are located on the other end, e.g., end 38. Once installed, the legs of the hairpins are bent away from each other to connect with the legs of other hairpins. The ends of corresponding hairpins are joined by a connection such as a weld 48. The connections may be arranged in rows such as weld rows 62. End 36 may be referred to as the vertex end and end 38 may be referred to as the weld end.

The U phase may include a plurality of pins 42a and a plurality of pins 42b. The pins 42a are connected to each other to form a first path 44, and the pins 42b are connected to each other to form a second path 46. Each of the paths includes a first end that starts at the terminal 50 and a second end that ends at a neutral connection 52. The paths 44, 46, are connected to each other at the terminal 50 and at the neutral connection 52, but are otherwise electrically isolated from each other. Each of the paths encircles the stator core 32 by weaving in and out of corresponding ones of the slots 34. Each of the paths may generally extend around the core 32 approximately three times in the counterclockwise direction and just short of three times in the clockwise direction. In the illustrated embodiment, each of the paths includes twenty-four pins that are interconnected end-to-end to form a continuous conductor between the terminal 50 and the neutral connection 52.

The V phase may include a plurality of pins 56a and 56b that are interconnected to form a first path 58 and a second path 60, respectively. Each of the paths includes a first end that starts at a terminal 64 and a second end that ends at a neutral connection 52. The paths 58, 60 are connected to each other at the terminal 64 and at the neutral connection 52 but are otherwise electrically isolated from each other. Each of the paths encircles the stator core 32 by weaving in and out of select ones of the slots 34. Each of the paths may generally extend around the core approximately three times in the counterclockwise direction and just short of three times in the clockwise direction. In the illustrated embodiment, each of the paths 58, 60 includes twenty-four pins that are generally interconnected end-to-end to form a continuous conductor between the terminal 64 and the neutral connection 52.

The W phase may include a plurality of pins 70a and 70b that are interconnected to form a first path 72 and a second path 74, respectively. Each of the paths includes a first end that starts at a terminal 78 and a second end that ends at a neutral connection 52. The neutral connection may be a single neutral connection, e.g., a single strip of metal, used to connect all six paths. The paths 72, 74 are connected to each other at the terminal 78 and at the neutral connection 52 but are otherwise electrically isolated from each other. Each of the paths 72, 74 encircles the stator core 32 by weaving in and out of select ones of the slots 34. Each of the paths may generally extend around the core approximately three times in the counterclockwise direction and just short of three times in the clockwise direction. In the illustrated embodiment, each of the paths 72, 74 includes twenty-four pins that are interconnected end-to-end to form a continuous conductor between the terminal 78 and the neutral connection 52. The terminals 50, 64, 78 may be connected to the inverter and receive voltage from the inverter, which creates torque-producing current in the winding paths causing the rotor 24 to rotate within the stator 22.

Figure 3:
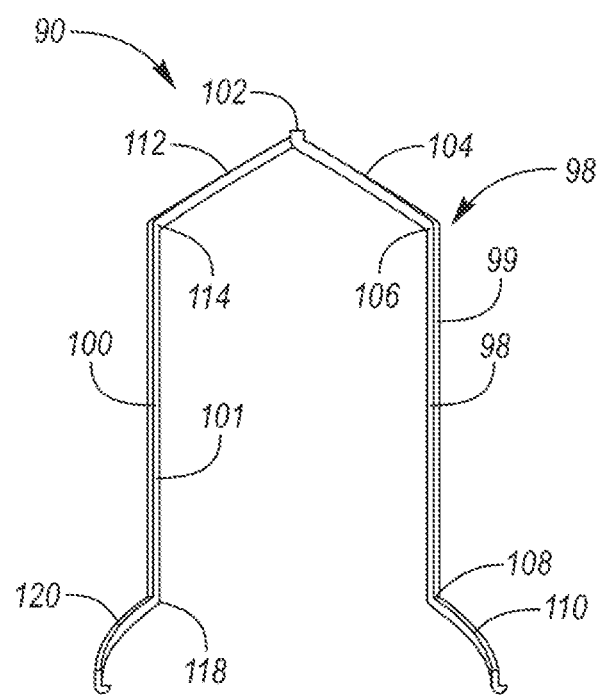
FIG. 3 is a front view of a regular hairpin.

Referring to FIG. 3, the hairpins of each of the paths may include one or more types of pin such as a regular pin 90 and a turnaround pin 92. For simplicity, the regular pins may be referred to as pins 90. The regular pins 90 may include a first leg 98 joined to a second leg 100 at a vertex 102 (also known as a crown). The vertex 102 may radially offset the legs. The vertex 102 may be formed by a twist that radially offset the legs by the dimension of one pin in the radial direction. The pins 90 may be formed from a single piece of metal such as copper, aluminum, silver, or any other electrically conductive material. The first leg 98 is disposed in one of the slots 34 and the second leg 100 is disposed in another of the slots 34 that is spaced apart by a span of slots. The regular pins 90 may have a span equal to the number of slots per pole, which is six slots in the illustrated embodiment. Thus, if the first leg 98 was in Slot 1, the second leg 100 would be in Slot 7. The first leg 98 includes a straight portion 99 disposed within a slot 34 and a first angled portion 104 that extends between the vertex 102 and the straight portion 99. The straight portion 99 and the angled portion 104 are joined at a first bend 106. The first leg 98 also includes a weld segment 110 that is angled outward at a second bend 108. The second leg 100 includes a straight portion 101 disposed within a slot 34 and a first angled portion 112 that extends between the vertex 102 and the straight portion 101. The straight portion 101 and the angled portion 112 are joined at a first bend 114. The second leg 100 also includes a weld segment 120 that is angled outward at a second bend 118. The weld segments 110, 120 angle in opposite directions to extend away from the pin 90 to connect with other pins of the path. Most of the weld segments 110, 120 may have a span that is equal to the pin span divided by 2, which is three (6/2) in the illustrated embodiment. (The pins 90 that attached to the terminals and neutral connected may have a slightly longer or shorter weld segment to facilitate the connection.) Thus, most of the pins 90 have a total span of twelve slots.

The regular pin 90 may be fabricated by first forming the vertex 102, the first angled portions 104, 112, and two extended straight portions. Then, the pin 90 is installed into the stator 22 by inserting the extended straight portions into the slots 34 of the stator 22. The second bends 108, 118 and the weld segments 110, 120 are formed after the pin 90 is installed through the slots by bending the extended legs as desired.

Figure 4:
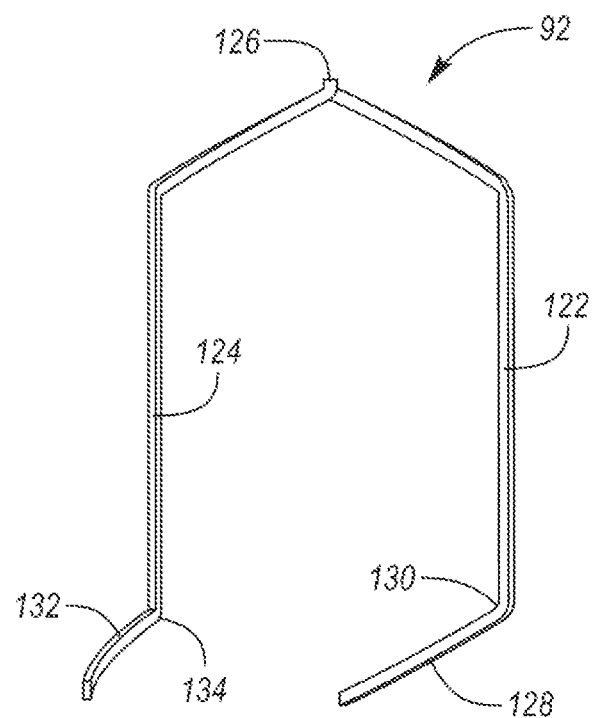
FIG. 4 is a front view of a turnaround hairpin.

Referring to FIG. 4, a turnaround pin 92 includes a first leg 122 and a second leg 124 joined at a vertex 126. The turnaround pin 92 is used to change the direction of the path, e.g., from clockwise to counterclockwise. The turnaround pin 92 may include a same span as the regular pins 90, which is six slots in the illustrated embodiment. The shape of the turnaround pin 92 is similar to the regular pin 90 except the weld segments 128 and 132 extend in a same direction, i.e., the weld segment 128 extends inward whereas the weld segment 132 extends outward.

Each of the weld segments 128, 132 may have a span that is equal to the pin span divided by 2, which is three (6/2) in the illustrated embodiment, but because the weld segments 128, 130 extend in the same direction, each pin 92 has a total span of nine slots.

Figure 6:
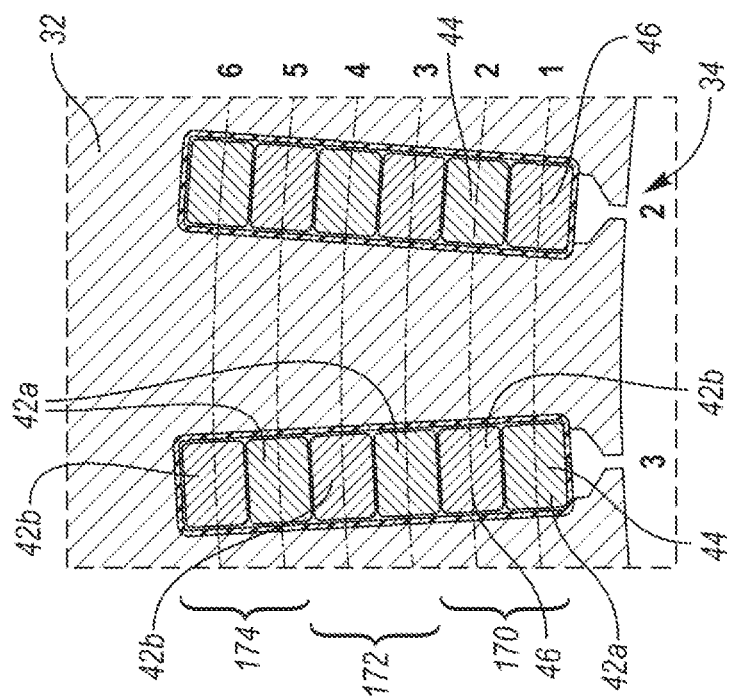
FIG. 6 is a magnified view of portion of FIG. 5.
Figure 5:
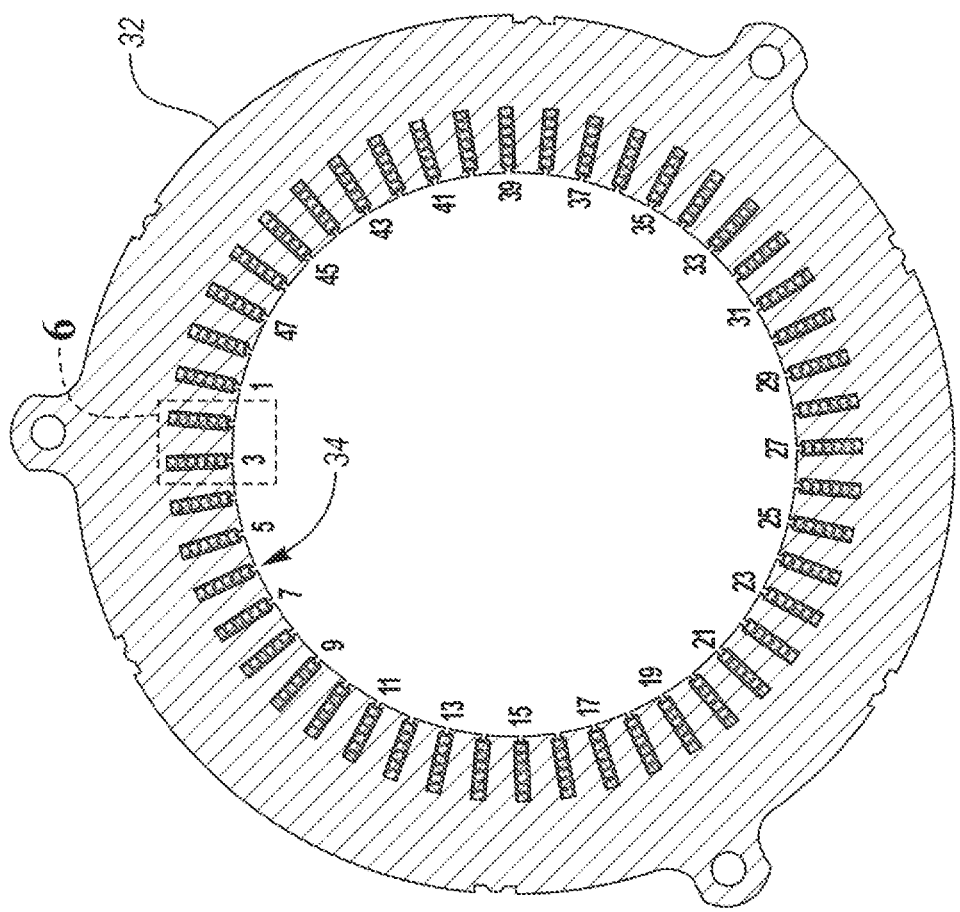
FIG. 5 is a cross-sectional end view of the stator of FIG. 2.

Referring to FIGS. 5 and 6, the slots 34 are arranged 1 through 48 in the counterclockwise direction with the odd number slots being labeled for convenience. The slots 34 may include an inner radial layer 170 of pins, a middle radial layer 172 of pins, and an outer radial layer 174 of pins. Each of the layers may include at least two radial positions that are adjacent to each other. In the illustrated embodiment, each slot 34 has six sequential positions in a one-by-six linear arrangement. The first position is near the inner diameter (ID) of the stator core 32 and the sixth position is near the outer diameter (OD) of the stator core 32. The inner layer 170 includes the first and second positions; the middle layer 172 includes the third and fourth positions; and the outer layer 174 includes the fifth and sixth positions.

The phases are arranged in groups to occupy adjacent slots in each of the poles. In pole 1, for example, the U phase occupies slots 2 and 3. The poles are balanced with each path occupying all of the radial layers a same number of the times, e.g., each path occupies each radial layer twice. Each slot also includes a same number of hairpins for each path of the phase disposed in that slot, e.g., Slot 3, which contains the U phase, has three hairpins 42a and three hairpins 42b. The stator is also arranged so that the paths alternate along the slots, e.g., in Slot 3, paths 44 and 46 alternate with path 44 being in positions 1, 3, and 5, and with path 46 being in positions 2, 4, and 6. The alternating sequence is opposite in the adjacent slot, e.g., in Slot 2, paths 44 and 46 alternate with path 46 being in positions 1, 3, and 5, and with path 44 being in positions 2, 4, and 6. In the illustrated embodiment, each path occupies each radial position eight times. The paths are arranged so that, for each of the corresponding slots, the pins of a same path are in different radial layers so that each path occupies all of the radial layers in the corresponding slot. Referring to Slot 3, for example, the first path 44 occupies the first position of the inner layer 170, the third position of the middle layer 172, and the fifth positions of the outer layer 174.

The other phases are similarly balanced. This arrangement creates substantially similar inductances for each path favoring a balanced sharing of the total current between the three paths, correcting a common shortcoming of other solutions.

Figure 8:
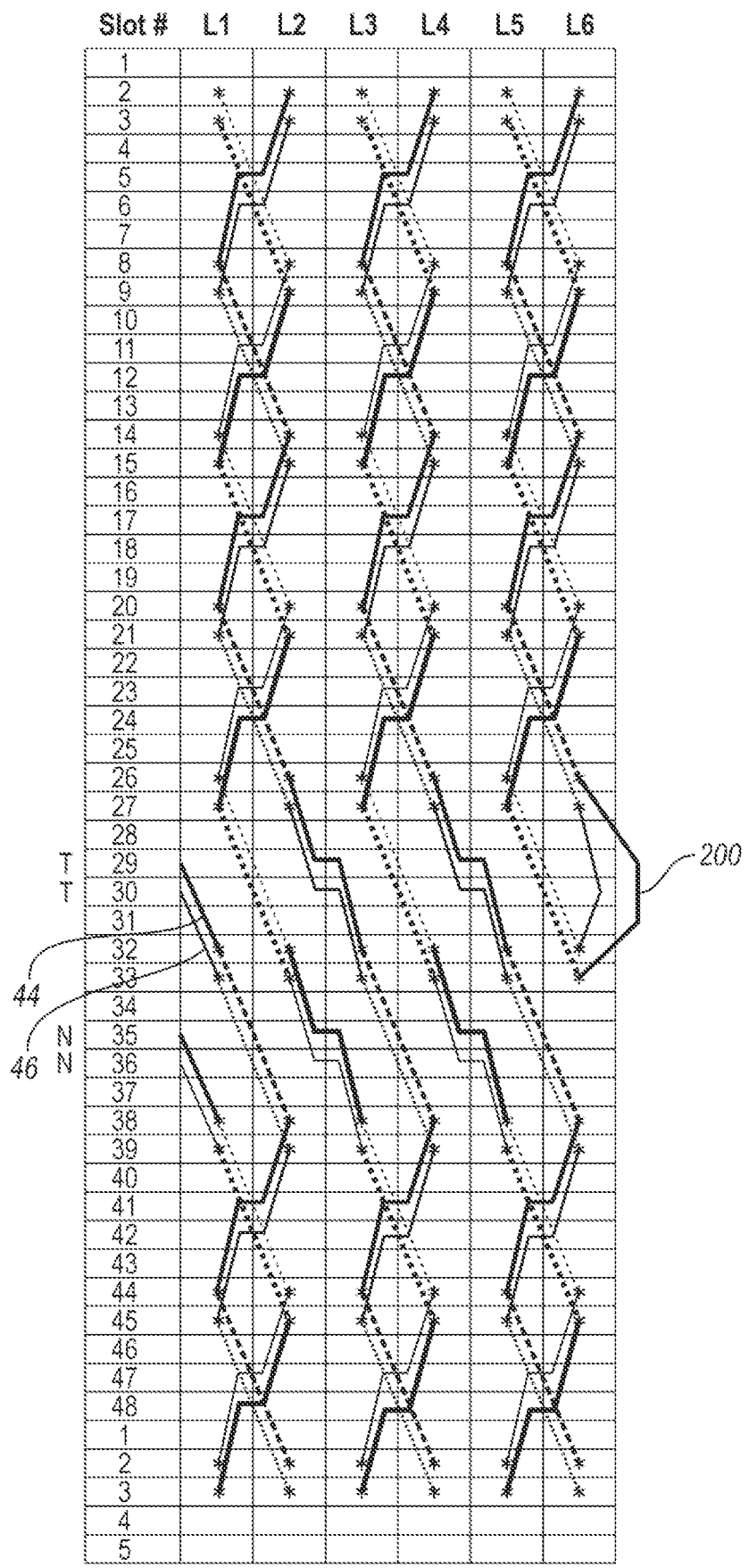
FIG. 8 is a winding diagram of the U phase. The first parallel path is shown in bold lines, and the second parallel path is shown in thin lines. The dashed lines indicate the path being on the vertex end of the stator, and the solid lines indicates the path being on the weld end of the stator. Horizontal lines indicate welds.

The U phase will now be described. The pins 42a and 42b of the first path 44 and the second path 46, respectively, may be comprised of twenty-three regular pins 90 and one turnaround pin 92. Referring to FIGS. 7 and 8, the first path 44 begins with Pin 1, which is a regular pin 90 having a first end of the weld segment 110 attached the terminal 50. The weld segment 110 includes a radially extending segment (terminal lead) 111 terminating at a terminal end 115 of the path 44. The terminal end 115 is connected to the terminal 50 by welding or the like. The weld segment 110 of Pin 1 is shaped so that the radially extending segment 111 is disposed between an adjacent pair of weld rows 62. The first leg 98 of Pin 1 is disposed in the first position of slot 32 and the second leg 100 is disposed in the second position of Slot 38. Pin 2 has a first leg 98 disposed in the first position of Slot 44 and a second leg 100 disposed in the second position of Slot 2. The weld segment 120 of Pin 1 is attached to the weld segment 110 of Pin 2 by weld 48a near Slot 41. For brevity, Applicant refers to Table 1 for description of the remaining pins. Areas of note will now be described in detail. (In Table 1, subscript denotes slot position.)

TABLE 1

| Pin | First Leg | Second Leg | Layer |
|---|---|---|---|
| 1 | $32_1$ | $38_2$ | Inner |
| 2 | $44_1$ | $2_2$ | Inner |
| 3 | $8_1$ | $14_2$ | Inner |
| 4 | $20_1$ | $26_2$ | Inner |
| 5 | $32_3$ | $38_4$ | Middle |
| 6 | $44_3$ | $2_4$ | Middle |
| 7 | $8_3$ | $14_4$ | Middle |
| 8 | $20_3$ | $26_4$ | Middle |
| 9 | $32_5$ | $38_6$ | Outer |
| 10 | $44_5$ | $2_6$ | Outer |
| 11 | $8_5$ | $14_6$ | Outer |
| 12 | $20_5$ | $26_6$ | Outer |
| Jumper | 29 | 31 | |
| 13 | $33_6$ | $27_5$ | Outer |
| 14 | $21_6$ | $15_5$ | Outer |
| 15 | $9_6$ | $3_5$ | Outer |
| 16 | $45_6$ | $39_5$ | Outer |
| 17 | $33_4$ | $27_3$ | Middle |
| 18 | $21_4$ | $15_3$ | Middle |
| 19 | $9_4$ | $3_3$ | Middle |
| 20 | $45_4$ | $39_3$ | Middle |
| 21 | $33_2$ | $27_1$ | Inner |
| 22 | $21_2$ | $15_1$ | Inner |
| 23 | $9_2$ | $3_1$ | Inner |
| 24 | $45_2$ | $39_1$ | Inner |

Path 44 starts in the counterclockwise direction and continues in that direction to Pin 12. The end of Pin 12 is located at Slot 29 and, at this point, the path 44 has completed three rotations in the counterclockwise direction. The weld segment 120 of Pin 12 is attached to a jumper 200.

The jumper 200 may be a U-shaped strip of metal that includes a first leg 202 and a second leg 204. The jumper 200 may be formed from the same metal blanks as the hairpins. The jumper 200 is used to interconnect adjacent hairpins and to shift the slots in which the hairpins of that path reside. The first leg 202 is attachable to one of the hairpins of the path 44, and the second leg 204 is attachable to another hairpin of the path 44. The jumper 200 may have a span equal to the pin span divided by 2, which is three (6/2) in the illustrated embodiment.

The first leg 202 is attached to the weld segment 120 of Pin 12 by a weld 206. The second leg 204 is attached to the weld segment 128 of the turnaround pin 92a by weld 208. The jumper 200 is disposed outside of the outer layer 174 with the U-shaped portion 205 facing the end 38 of the stator core 32 so that the jumper 200 does not extend any higher from the end 38 than the hairpins. The U-shape provides clearance for the terminal leads 111, 113 of the paths 44, 46 to extend through the opening of the jumper and connect to the terminal 50.

In an alternative embodiment, the jumper may be a straight strip that is disposed over terminal leads 111, 113. Here, the terminal leads may extend to the ID of the stator and be welded to the first pins of the paths 44 and 46 near the ID.

The turnaround pin 92a, which is Pin 13, switches rotation of the path 44 from counterclockwise to clockwise beginning at Slot 33. The first leg 122 of the turnaround pin 92a is disposed in the sixth position of Slot 33 and the second leg 124 is disposed in the fifth position of Slot 27. The turnaround pin 92a is attached to the Pin 14 that has a first leg 98 disposed in the sixth position of Slot 21 and a second leg 100 disposed in the fifth position of Slot 15. Pins 15 through 24 continue weaving in the clockwise direction. Pin 24 is the last pin of path 44 and connects to the neutral connection 52 (not shown) at a neutral end 218 of path 44. The second weld segment 120 of Pin 24 may be elongated so that the end of Pin 24 can be positioned higher than the weld rows 62 enabling attachment to the neutral connection 52.

Referring to FIGS. 2 and 8, path 46 is similar to path 44 except that path 46 is shifted one slot over and does not include a jumper. Path 46 begins near Slot 30 where the terminal lead 113 of Pin 1 attaches to the terminal 50. Similar to path 44, path 46 begins by weaving in the counterclockwise direction. Pin 1 has a first leg 98 disposed in the first position of Slot 33 and a second leg 100 disposed in the second position of Slot 39. Path 46 continues in the counterclockwise direction to Pin 12. Pin 12 has a first leg disposed in the fifth position of Slot 21 and a second leg 100 disposed in the sixth position of Slot 27. Unlike path 44, a jumper is not used, and the weld segment 120 of Pin 12 is directly attached to the weld segment 128 of the turnaround pin 92b.

The turnaround pin 92b, which is Pin 13, switches rotation of the path 46 from counterclockwise to clockwise beginning at Slot 32. The first leg 122 of the turnaround pin 92b is disposed in the sixth position of Slot 32 and the second leg 124 is disposed in the fifth position of Slot 26. The turnaround pin 92b is attached to the Pin 14, which has a first leg 98 disposed in the sixth position of Slot 20 and a second leg 100 disposed in the fifth position of Slot 14. Pins 15 through 24 continue weaving in the clockwise direction. Pin 24 is the last pin of path 46 and connects to the neutral connection 52 at a neutral end 220 of path 46. The second weld segment 120 of Pin 24 may be elongated so that the end of Pin 24 can be positioned higher than the weld rows 62 enabling attachment to the neutral connection 52. See Table 2 for full details of path 46.

TABLE 2

| Pin | First Leg | Second Leg | Layer |
|---|---|---|---|
| 1 | $33_1$ | $39_2$ | Inner |
| 2 | $45_1$ | $3_2$ | Inner |
| 3 | $9_1$ | $15_2$ | Inner |
| 4 | $21_1$ | $27_2$ | Inner |
| 5 | $33_3$ | $39_4$ | Middle |
| 6 | $45_3$ | $3_4$ | Middle |
| 7 | $9_3$ | $15_4$ | Middle |
| 8 | $21_3$ | $27_4$ | Middle |
| 9 | $33_5$ | $39_6$ | Outer |
| 10 | $45_5$ | $3_6$ | Outer |
| 11 | $29_5$ | $15_6$ | Outer |
| 12 | $21_5$ | $27_6$ | Outer |
| 13 | $32_6$ | $26_5$ | Outer |
| 14 | $20_6$ | $14_5$ | Outer |
| 15 | $8_6$ | $2_5$ | Outer |
| 16 | $44_6$ | $38_5$ | Outer |
| 17 | $32_4$ | $26_3$ | Middle |
| 18 | $20_4$ | $14_3$ | Middle |

TABLE 2-continued

| Pin | First Leg | Second Leg | Layer |
|---|---|---|---|
| 19 | $8_4$ | $2_3$ | Middle |
| 20 | $44_4$ | $38_3$ | Middle |
| 21 | $32_2$ | $26_1$ | Inner |
| 22 | $20_2$ | $14_1$ | Inner |
| 23 | $8_2$ | $2_1$ | Inner |
| 24 | $44_2$ | $38_1$ | Inner |

Figure 9:
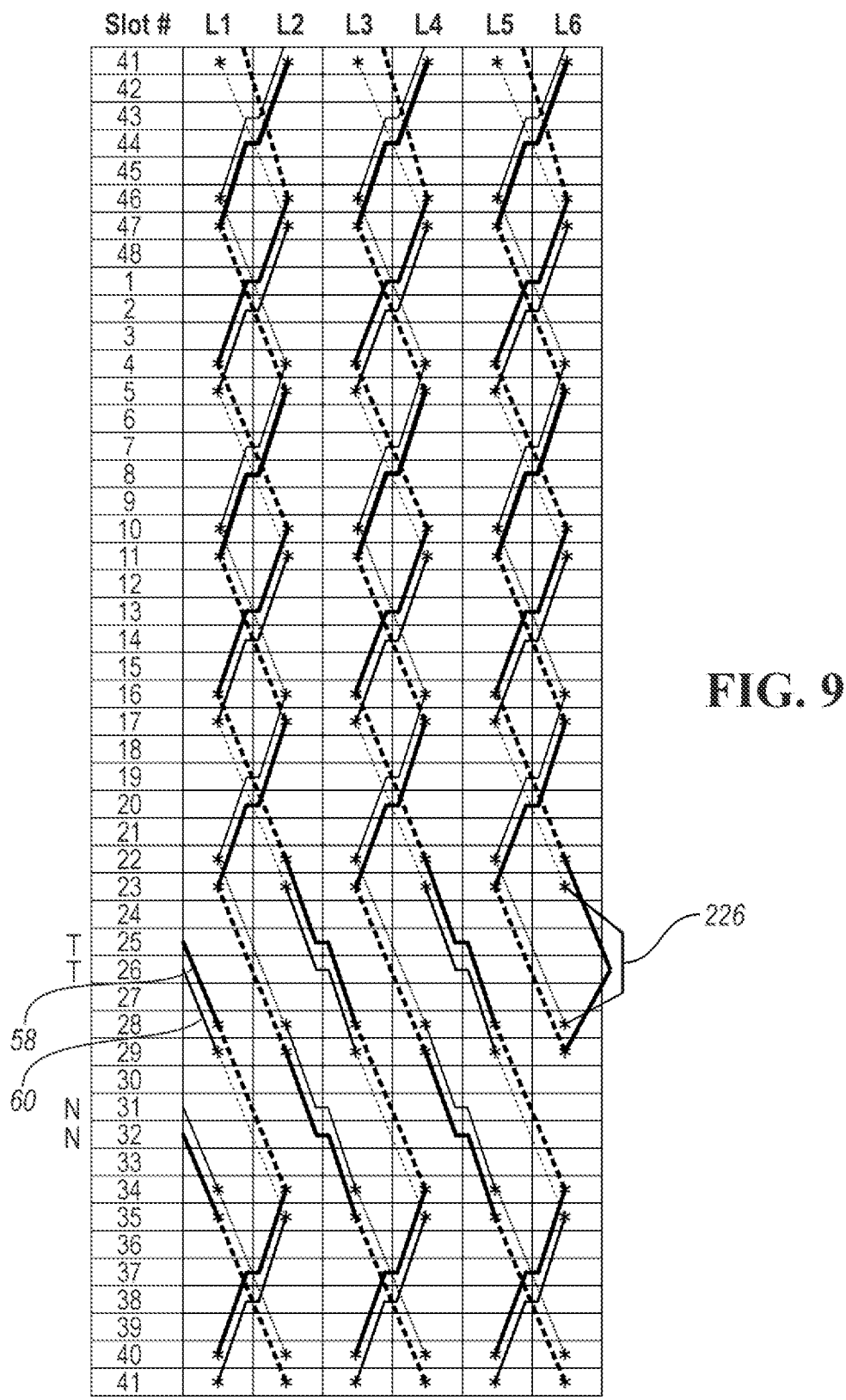
FIG. 9 is a winding diagram of the W phase. The first parallel path is shown in bold lines, and the second parallel path is shown in thin lines. The dashed lines indicate the path being on the vertex end of the stator, and the solid lines indicates the path being on the weld end of the stator. Horizontal lines indicate welds.

Referring to FIGS. 2 and 9, the V phase is similar to the U phase expect shifted four slots in the clockwise direction. The V phase begins at the terminal 64 with the first pin 222 of phase 58 connected to one prong of the terminal 64, and with the first pin 224 of phase 60 connected to the other prong of the terminal 64. Radially extending portions (terminal leads) of the pins 222 and 224 extend between the weld rows 62 to limit the height of the end windings. The paths 58, 60 weave through the stator core in the counter clockwise direction through Pin 12. Path 60 includes a jumper 226 connected to the end of Pin 12. The jumper 226 may be the same as jumper 200. Pin 13 of path 60, which is a turnaround pin 92, is connected to the other end of the jumper 226 and reverses direction of the path 60 to the clockwise direction. Path 58 does not include a jumper, and Pin 12 of path 58 is directly connected to Pin 13, which is a turnaround pin 92 that reverses the direction of the path 58 to the clockwise direction. The paths 58 and 60 continue in the clockwise direction until the neutral ends 230, 232, respectively. The neutral ends 230 and 232 connect with the neutral terminal 52.

Figure 10:
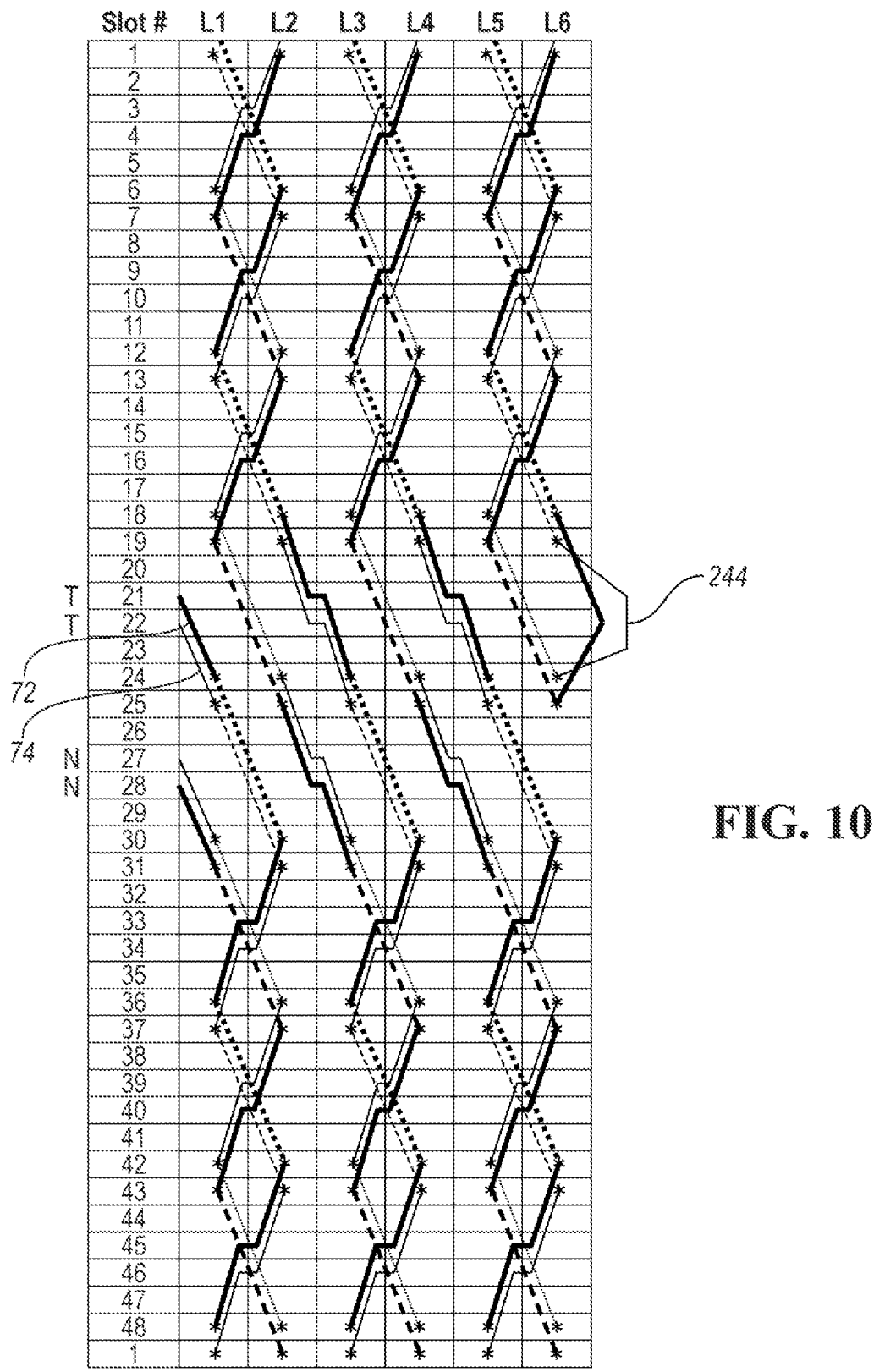
FIG. 10 is a winding diagram of the V phase. The first parallel path is shown in bold lines, and the second parallel path is shown in thin lines. The dashed lines indicate the path being on the vertex end of the stator, and the solid lines indicates the path being on the weld end of the stator. Horizontal lines indicate welds.

Referring to FIGS. 2 and 10, the W phase is similar to the U phase expect shifted eight slots in the clockwise direction. The W phase begins at the terminal 78 with the first pin 240 of phase 72 connected to one prong of the terminal 78, and with the first pin 242 of phase 74 connected to the other prong of the terminal 78. Radially extending portions (terminal leads) of the pins 240 and 242 extend between the weld rows 62 to limit the height of the end windings. The paths 72, 74 weave through the stator core in the counter-clockwise direction through Pin 12. Path 74 includes a jumper 244 connected to the end of Pin 12. The jumper 244 may be the same as jumper 200. Pin 13 of path 74, which is a turnaround pin 92, is connected to the other end of the jumper 244 and reverses direction of the path 74 to the clockwise direction. Path 72 does not include a jumper, and Pin 12 of path 72 is directly connected to Pin 13, which is a turnaround pin 92 that reverses the direction of the path 72 to the clockwise direction. The paths 72 and 74 continue in the clockwise direction until the neutral ends 246, 248, respectively. The neutral ends 246 and 248 connect with the neutral terminal 52.

Figure 11:
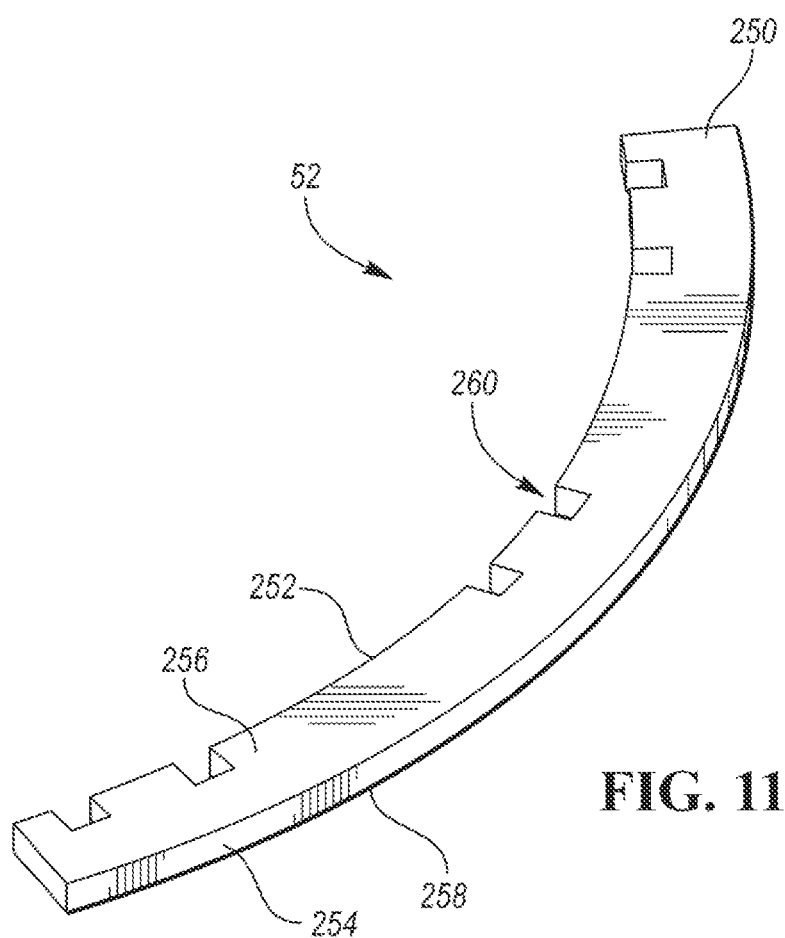
FIG. 11 is a perspective view of a neutral connection for the electric machine of FIG. 2.

Referring to FIG. 11, the neutral connection 52 may include an arcuate body 250 having an inner side 252, an outer side 254, a top 256, and a bottom 258. The inner side 252 defines open slots 260 extending from the inner side 252 towards the outer sides 254. The slots 260 may extend from the bottom 258 to the top 256 so that the slots 260 extend completely through a thickness of the neutral connection 52. The slots 260 receive the ends of the paths therein. The ends are attached to the perimeter of the slots 260 by welding, soldering, or the like to form an electrical connection. The number of slots 260 may be equal to the number of paths. Thus, in the illustrated embodiment, the neutral connection 52 defines six open slots 260 each configured to receive one of the paths therein. In other embodiments, the slots 260 may be closed, and the ends are inserted into the neutral connection 52 through the bottom 258.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
  a stator core defining slots;
  hairpins disposed in the slots and selectively joined at connections to form windings; and
  a U-shaped jumper having spaced legs interconnected by a U-portion, the legs being attached to a pair of the hairpins at a location radially outboard of the slots such that the U-portion faces the core, wherein a terminal lead of the windings radially extends between the legs.

2. The electric machine of claim 1, wherein the terminal lead is an integral portion of one of the hairpins, and further comprising a terminal disposed radial outboard of the jumper and including a portion circumferentially disposed between the legs to connect with the terminal lead that extends through a space defined between the legs to connect the one of the hairpins that is radially inboard of the jumper to the terminal that is radial outboard of the jumper.

3. The electric machine of claim 1, wherein each of the hairpins includes a first leg disposed in one of the slots and a second leg disposed in another of the slots, wherein the first and second legs are spaced apart by a hairpin span that is equal to the number of slots between the first and second legs.

4. The electric machine of claim 3, wherein the legs of the jumper are spaced apart by a span of slots that is equal to half of the hairpin span.

5. The electric machine of claim 4, wherein the legs of the jumper are spaced apart by three slots.

6. The electric machine of claim 1, wherein the windings include multiple paths that each includes corresponding ones of the hairpins interconnected to form a continuous electrical circuit between a terminal end and a neutral end.

7. The electric machine of claim 6, wherein each path includes regular hairpins and a turnaround hairpin.

8. The electric machine of claim 7, wherein the jumper is attached to one of the regular hairpins and to the turnaround hairpin.

9. The electric machine of claim 6 further comprising a neutral connection that is attached to each of the neutral ends.

10. The electric machine of claim 9, wherein the neutral connection includes an arcuate body having an inner side and an outer side, wherein the inner side defines open slots extending from the inner side towards the outer side, and wherein each of the slots receives one of the neutral ends therein.

11. An electric machine comprising:
a stator core having opposing ends defining slots that extend between the ends, the slots having radial positions arranged in concentric layers that include at least an inner layer and an outer layer;
windings disposed in the core and arranged in three phases each having at least a jumper-less first path including only first hairpins interconnected to form a continuous circuit between a terminal end and a neutral end, and a second path including interconnected second hairpins and a jumper interconnecting adjacent ones of the second hairpins that are located in the outer layer to form a continuous circuit between a terminal end and a neutral end, wherein the jumper is U-shaped and includes a first leg attached to one of the adjacent ones of the second hairpins at a location that is radially outboard of the slots, a second leg attached to the other of the adjacent ones of the second hairpins at a location that is radially outboard of the slots, and a U-portion, wherein the jumper is oriented with the legs extending in an axial direction of the stator core and with the U-portion being closer to a corresponding one of the opposing ends than the legs; and
a neutral connection including an arcuate body having an inner side and an outer side, wherein the inner side defines open slots, equal in number to the neutral ends, extending from the inner side towards the outer side, and wherein each of the slots receives one of the neutral ends therein.

12. The electric machine of claim 11, wherein the second path only includes a single jumper.

13. The electric machine of claim 11, wherein the stator core defines a plurality of slots, and wherein each of the first and second hairpins includes a first leg disposed in one of the slots and a second leg disposed in another of the slots, the first and second legs being spaced apart by a hairpin span that is equal to the number of slots between the first and second legs, and wherein the legs of the jumper are spaced apart by a span of slots that is equal to half of the hairpin span.

14. The electric machine of claim 11, wherein the second hairpins include regular hairpins, and a turnaround hairpin attached to the jumper.

15. The electric machine of claim 11, wherein the neutral ends are welded to the open slots of the neutral connection.

16. An electric machine comprising:
a stator core defining slots having radial positions;
a plurality of hairpins each having a first leg disposed in one of the radial positions of a one of the slots and a second leg disposed in one of the radial positions, that is a different radial position than the first leg, of a another of the slots, wherein select ones of the hairpins are interconnected to form at least three pairs of first and second parallel winding paths with each pair corresponding to one of three phases of the electric machine, wherein each of the slots only includes hairpins of a same one of the phases and the first and second paths alternate along the radial positions, and wherein each of the winding paths includes a single terminal lead integrally formed with a corresponding one of the first legs and a single neutral end integrally formed with a corresponding one of the seconds legs;
at least three terminals each associated with one of the first winding paths;
at least three U-shaped jumpers, each being associated with one of the phases and including a U-portion, a first leg extending for the U-portion and attached to one of the hairpins of the first winding path, and a second leg extending for the U-portion and attached to another of the hairpins of the first winding path to create a continuous circuit between the terminal end and the neutral end associated with that first winding path, wherein a distance between the first and second legs of the jumpers is half of the distance between the first and second legs of the hairpins, and each of the jumpers are oriented with the U-portion facing the core and the first and second legs being arranged axially, and wherein the jumpers are located radially inboard of the terminals and located radially outboard of the slots, and wherein the terminal leads extend radially through the legs of the jumpers to join the first paths that are radially inboard of the jumper to the terminals that are radially outboard of the jumpers; and
a neutral connection having an inner surface defining opens slots that each receive one of the neutral ends therein.

17. An electric machine of claim 16, wherein the neutral ends are welded to the neutral connection.

* * * * *